(12) United States Patent
Ball et al.

(10) Patent No.: US 8,454,449 B2
(45) Date of Patent: Jun. 4, 2013

(54) DRIVE SHAFT WITH ARRAY TUNED ABSORBER

(75) Inventors: Arthur Ball, Oxford, MI (US); Crittenden A. Bittick, Rochester Hills, MI (US); Craig A. Campbell, West Bloomfield, MI (US); Jerry E. Shory, Columbiaville, MI (US)

(73) Assignee: GKN Driveline North America, Inc, Auburn Hills, MI (US)

( * ) Notice: Subject to any disclaimer, the term of this patent is extended or adjusted under 35 U.S.C. 154(b) by 180 days.

(21) Appl. No.: 12/742,140

(22) PCT Filed: Nov. 12, 2007

(86) PCT No.: PCT/US2007/084431
§ 371 (c)(1),
(2), (4) Date: May 10, 2010

(87) PCT Pub. No.: WO2009/064284
PCT Pub. Date: May 22, 2009

(65) Prior Publication Data
US 2010/0279781 A1 Nov. 4, 2010

(51) Int. Cl.
*F16F 7/10* (2006.01)

(52) U.S. Cl.
USPC .......................................... 464/180

(58) Field of Classification Search
USPC .................. 464/180, 181, 183, 127; 188/378, 188/379; 180/381
See application file for complete search history.

(56) References Cited

U.S. PATENT DOCUMENTS

| | | | |
|---|---|---|---|
| 3,075,406 A | | 1/1963 | Butler, Jr. et al. |
| 3,555,927 A * | | 1/1971 | Plume .......................... 464/180 |
| 4,392,681 A * | | 7/1983 | Raquet ...................... 464/180 X |
| 4,736,701 A * | | 4/1988 | Kondo et al. .............. 188/379 X |
| 4,739,702 A * | | 4/1988 | Kobler |
| 4,924,976 A * | | 5/1990 | Bernett .......................... 188/378 |
| 6,010,407 A * | | 1/2000 | Ishikawa ................... 464/180 X |
| 6,312,340 B1 | | 11/2001 | Gassen et al. |
| 6,623,365 B1 * | | 9/2003 | Maretzke et al. ............. 464/180 |
| 7,416,491 B2 | | 8/2008 | Campbell et al. |
| 7,464,800 B2 * | | 12/2008 | Nerubenko ................... 188/379 |
| 2005/0215331 A1* | | 9/2005 | Campbell ..................... 464/181 |
| 2005/0284713 A1* | | 12/2005 | Fischer |
| 2006/0169557 A1* | | 8/2006 | Goetchius ..................... 188/378 |
| 2007/0072688 A1* | | 3/2007 | Dickson et al. ............... 464/180 |
| 2007/0099713 A1 | | 5/2007 | Campbell et al. |
| 2011/0182535 A1* | | 7/2011 | Prieto ....................... 464/180 X |

* cited by examiner

*Primary Examiner* — Gregory Binda
*Assistant Examiner* — Matthieu Setliff
(74) *Attorney, Agent, or Firm* — Jennifer M. Brumbaugh; Mack Haynes; Rader, Fishman & Grauer, PLLC

(57) ABSTRACT

A vehicle driveline includes a tubular member (62) having an inside surface (64) and an axis, a mounting base (72) coupled to the tubular member (62), and a plurality of resonator members (74) each having a first end (80), a second end (82), and a center portion (84) interposed therebetween coupled to the mounting base and extending therefrom.

9 Claims, 11 Drawing Sheets

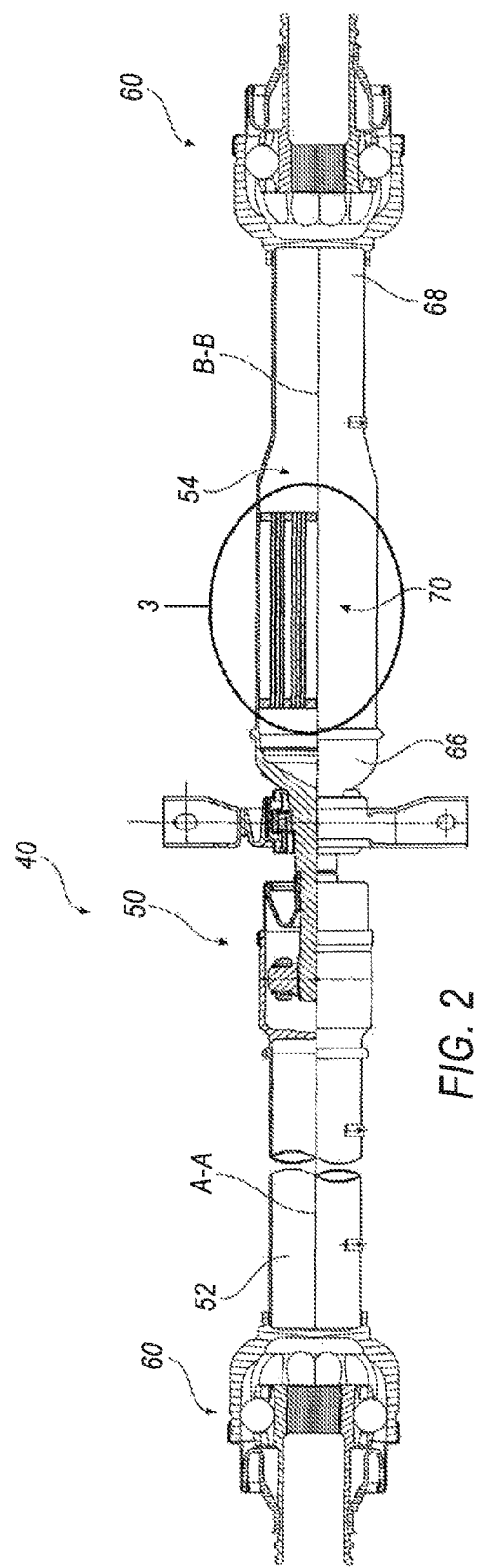
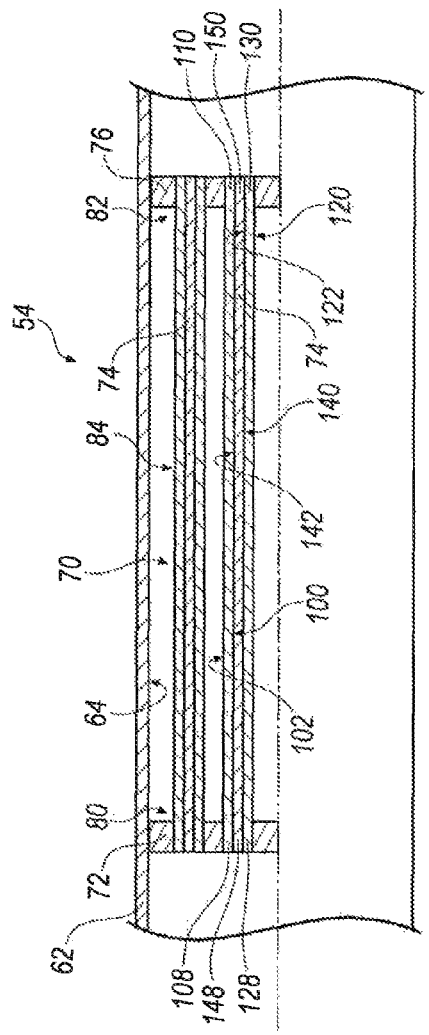
FIG. 2
FIG. 3

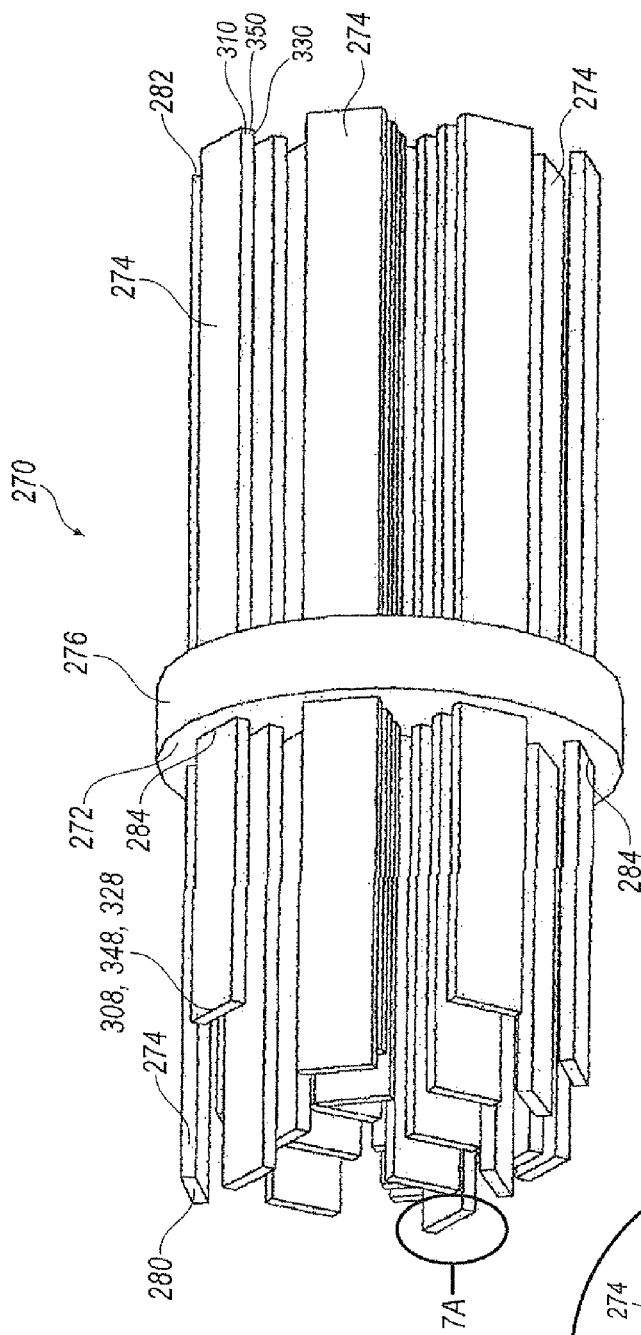
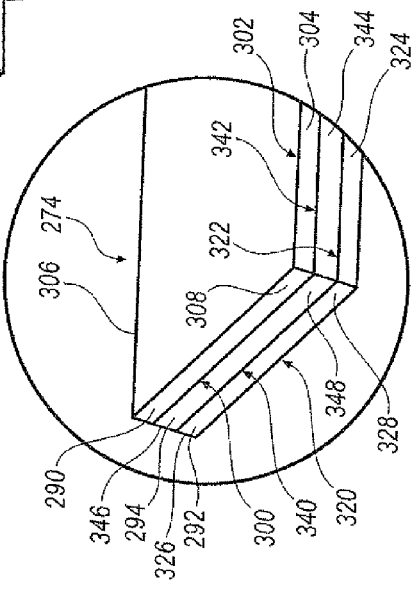
FIG. 7
FIG. 7A

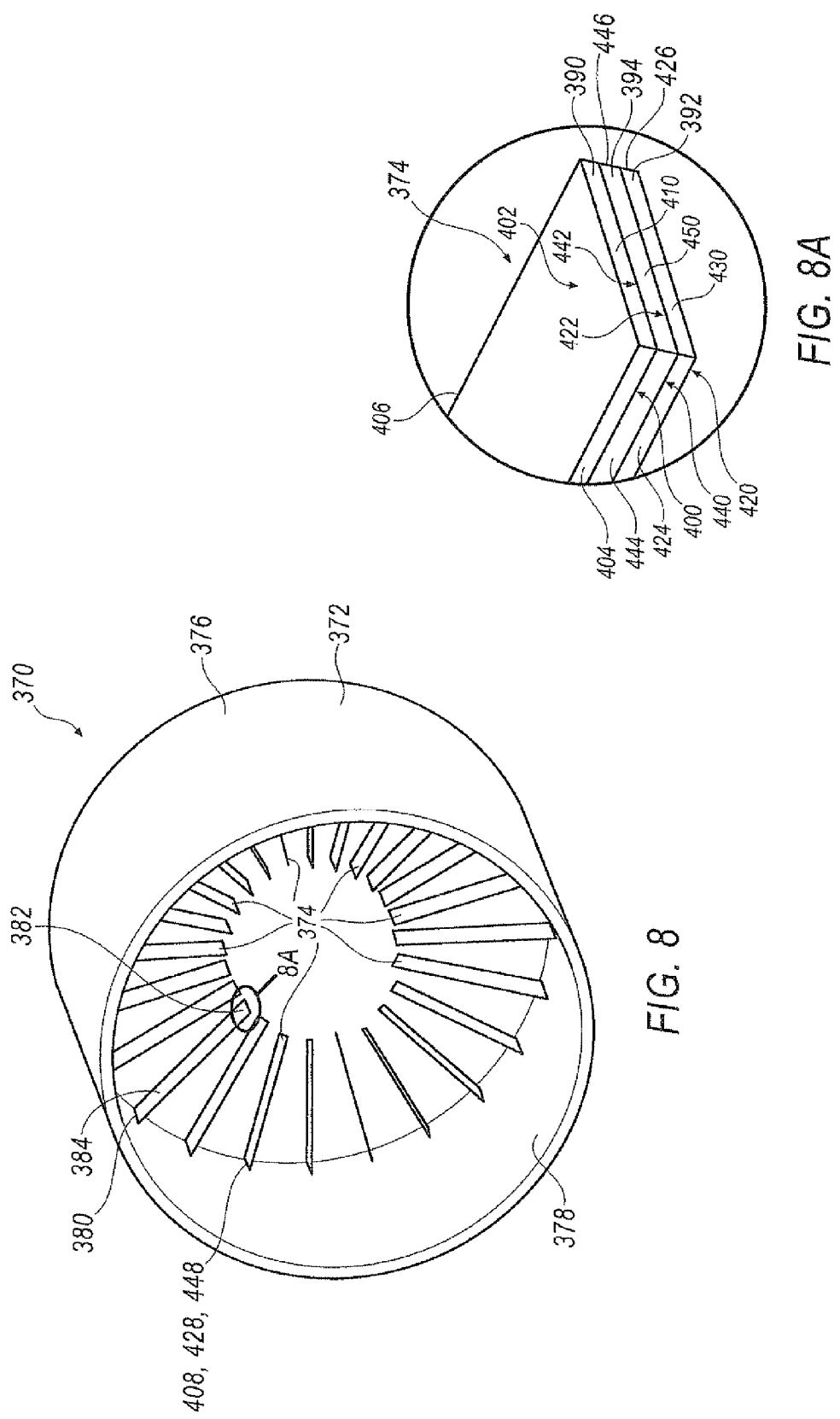

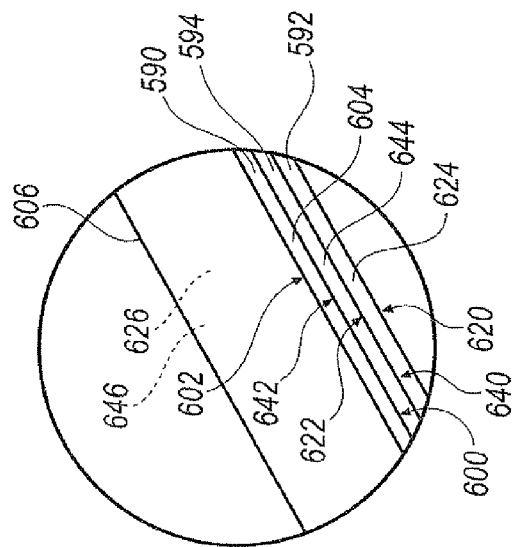
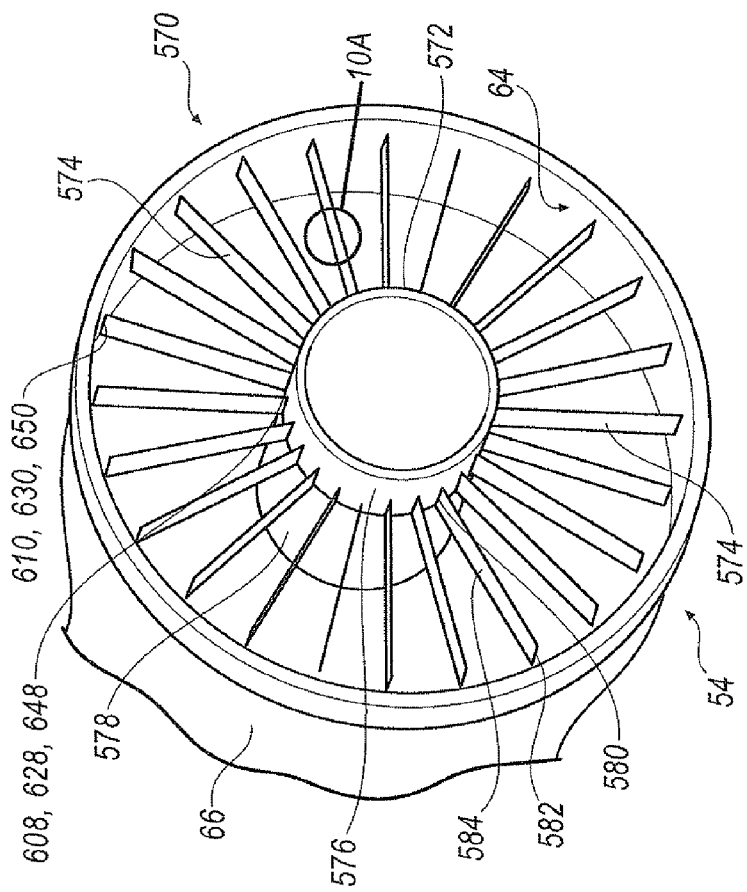

DRIVE SHAFT WITH ARRAY TUNED ABSORBER

TECHNICAL FIELD

The disclosure relates to vibration damping in rotating drivelines.

BACKGROUND

A motor vehicle generally utilizes a driveline containing propshafts to connect the transmission or power takeoff unit to the driving wheels. Propshafts may become rotationally unstable if operated at the rotational speed where the propshaft residual balance forces coincide with the propshaft natural bending resonance.

At certain rotational speeds and resonant frequencies the above-referenced propshafts typically exhibit unbalanced rotation and thus undesirable vibrations. These vibrations traditionally result in bending or torsional forces within and along the length of the respective propshaft. Such bending or torsional forces, as a result of the unbalanced rotation, are neither desirable nor suitable in the operation of the driveline systems of most vehicles. Additionally, vibrations from the engine or transmission may be undesirably transmitted through the propshafts.

Accordingly, various dynamic dampers or mass dampers are utilized to suppress the undesirable vibrations, whether induced in the rotary propshaft due to the unbalanced rotation or transmitted through the propshaft. These dampers are often installed or inserted directly onto or into the propshaft. The dampers are designed to generate a prescribed vibrational frequency adjusted to the dominant frequency of the undesired vibrations. The damper converts or transfers the vibrational energy of the propshaft to the damper by resonance, and eventually absorbs the vibrational energy of the propshaft. Therefore, the damper attempts to cancel or negate the vibrations that are induced onto or caused by the rotary propshaft in normal operation of the driveline system of the vehicle.

Many dampers generally include a mass member disposed between a pair of ring-shaped fixing members and a pair of connecting members. The connecting members connect the ends of the fixing members to the mass members. However, many of these traditional dampers are not easily tunable to specific frequencies and have difficulty controlling damping without extensive redesign of the damper and the propshaft for each automotive vehicle driveline system. Further, many traditional dampers include other mass members cantilevered from a connecting member. These mass members, essentially suspended from a theoretical spring, introduce an additional degree of freedom into the system thus producing another resonance.

Therefore, there is a need in the art for an improved internal absorber. There also is a need in the art for an internal absorber that does not use a cantilevered mass to create a dampening effect. There also is a need in the art for an internal absorber that is simple to install and modify to match specific frequencies and dampening levels of various vehicle driveline systems.

SUMMARY

An embodiment of a vehicle driveline includes a tubular member having an inside surface and an axis, a mounting base coupled to the tubular member, and a plurality of resonator members each having a first end, a second end, and a center portion interposed therebetween coupled to the mounting base and extending therefrom.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 2 is a partial sectional top view of the propshaft illustrated in FIG. 1.

FIG. 3 is a partial sectional view of area 3 of the propshaft of FIG. 2.

FIG. 7 is a perspective view of an alternative embodiment of the portion of FIG. 4.

FIG. 7A is an enlarged view of area 7A of FIG. 7.

FIG. 8 is a perspective view of an alternative embodiment of the portion of FIG. 4.

FIG. 8A is an enlarged view of area 8A of FIG. 8.

FIG. 10 is a partial cut-away view of alternative embodiment of the portion of FIG. 4.

FIG. 10A is an enlarged view of area 10A of FIG. 10.

DETAILED DESCRIPTION

Figure 1:
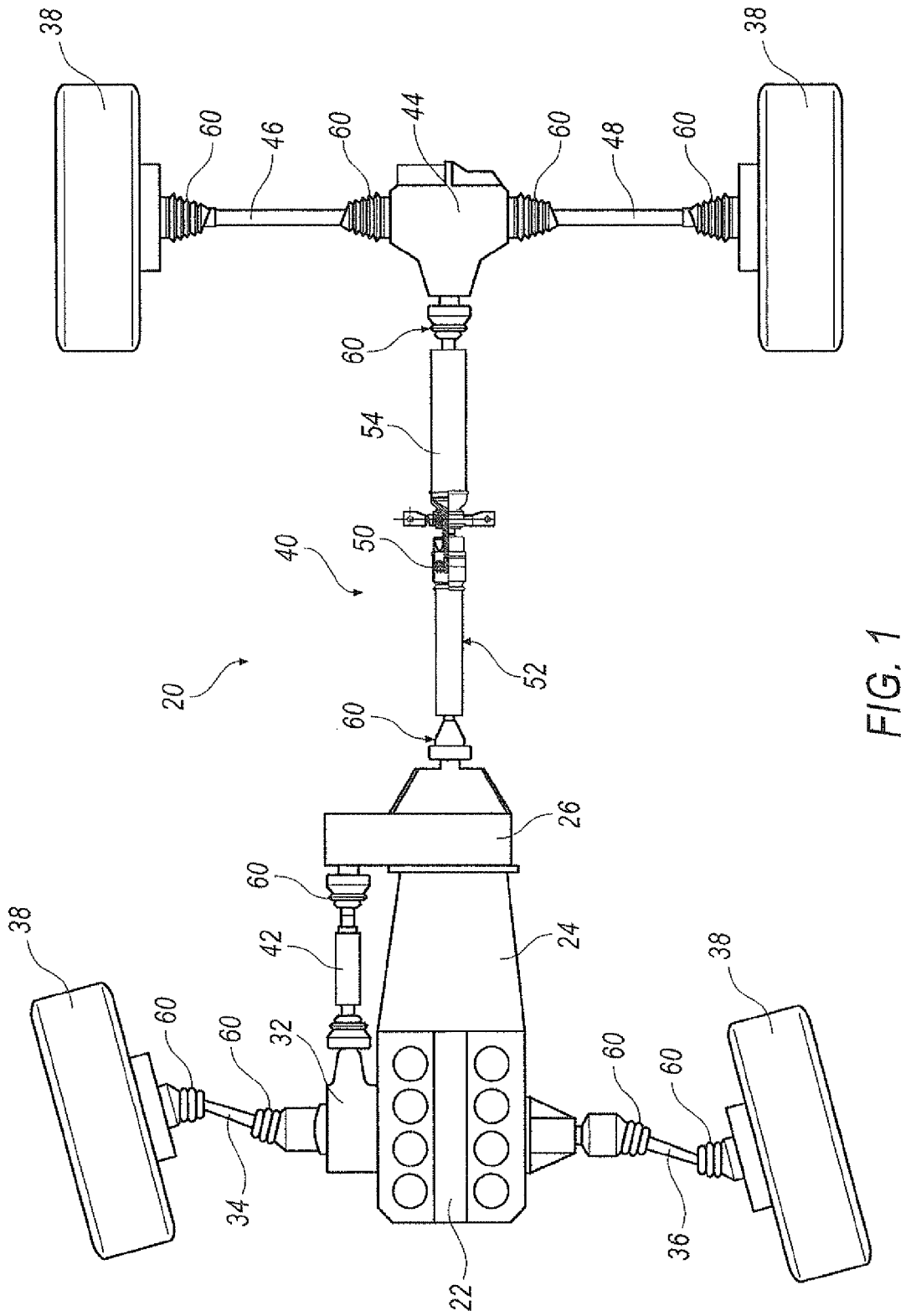
FIG. 1 is a top view of a driveline system.
Figure 4:
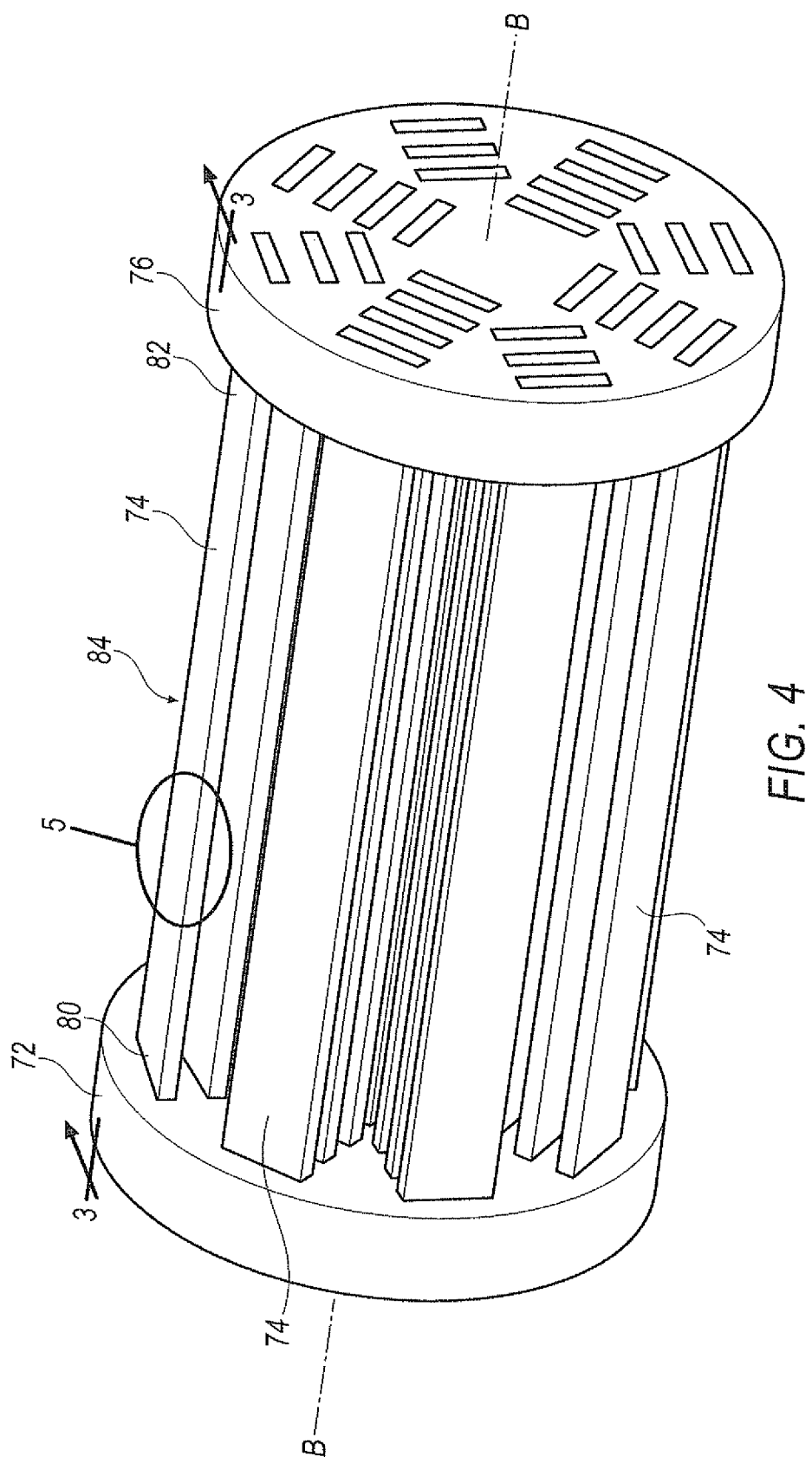
FIG. 4 is a perspective view of a portion of a propshaft of FIG. 2.

FIG. 1 illustrates a driveline 20 of a vehicle (not shown). The driveline 20 includes an engine 22 that is connected to a transmission 24 and a power take off unit 26. A front differential 32 has a right hand front half shaft 34 and a left hand front half shaft 36, each of which are connected to a wheel 38 and deliver power to those wheels 38. The power take off unit 26 has a propeller shaft 40 and a front wheel propeller shaft 42 extending therefrom. The front wheel propeller shaft 42 connects the front differential 32 to the power take off unit 26. The propeller shaft 40 connects the power take off unit 26 to a rear differential 44, wherein the rear differential 44 includes a rear right hand side shaft 46 and a rear left hand side shaft 48, each of which ends with a wheel 38 on one end thereof.

The propeller shaft 40, as best seen in FIG. 2, includes an articulated tripode joint 50, a front prop shaft 52, a rear prop shaft 54, and two high speed constant velocity joints 60. The front prop shaft 52 is defined by an axis A-A, and the rear prop shaft 54 is defined by an axis B-B. The constant velocity joints transmit power to the wheels 38 through the driveshaft 40 even if the wheels or the shaft have changing angles due to steering and suspension jounce and rebound. A constant velocity joint 60 is located on both ends of the half shafts that connect to the wheel 38 and the rear differential 44. On both ends of the right hand front half shaft 34 and left hand front half shaft 36 are constant velocity joints 60. In the embodiment illustrated, the rear prop shaft 54 includes a generally cylindrical tubular wall 62 having an inside surface 64, a first end 66, and a second end 68.

The constant velocity joints 60 may be of any of the standard types known, such as plunging tripod, cross groove joint, fixed ball joint, fixed tripod joint, or double offset joints, all of which are commonly known terms in the art for different varieties of constant velocity joints. The constant velocity joints 60 allow for transmission of constant velocities at angles which are found in everyday driving of automotive vehicles in both the half shafts and prop shafts of vehicles.

The driveline 20 represents an all wheel drive vehicle, however it should be noted that the embodiment of the constant velocity joints 60 of the current invention can also be used in rear wheel drive vehicles, front wheel drive vehicles, all wheel drive vehicles and four wheel drive vehicles.

As best seen in FIG. 3, the rear prop shaft 54 includes an array tuned absorber, or damper 70. The damper 70 includes a first mounting base 72 coupled to the inner surface 64, a plurality of resonator members 74, and a second mounting base 76 coupled to the inner surface 64.

The resonator members 74 each include a first end 80, a second end 82, and a center portion 84 interposed therebetween. The resonator members are constructed of a first layer 90, a second layer 92, and a third layer 94 interposed between the first layer 90 and the second layer 92. The first end 80 is coupled to the first mounting base 72 and extending therefrom. The second end 82 is coupled to the second mounting base 76 and extending therefrom. In the embodiment illustrated, the first ends 80 of the plurality of resonator members 74 are embedded in the first mounting base 72 and the second ends 82 of the plurality of resonator members 74 are embedded in the second mounting base 76, although any suitable coupling means may be used.

In the embodiment illustrated, the layers 90, 92, 94 form a constrained layer damper where layers 90 and 92 are metal and layer 94 is a resin, such as mastic. That is, the layer 94 is sufficiently flexible to permit relative movement between the layers 90, 92 while converting the energy of movement to heat, sound, or other forms of energy that results in the dissipation of energy of movement.

Figure 5:
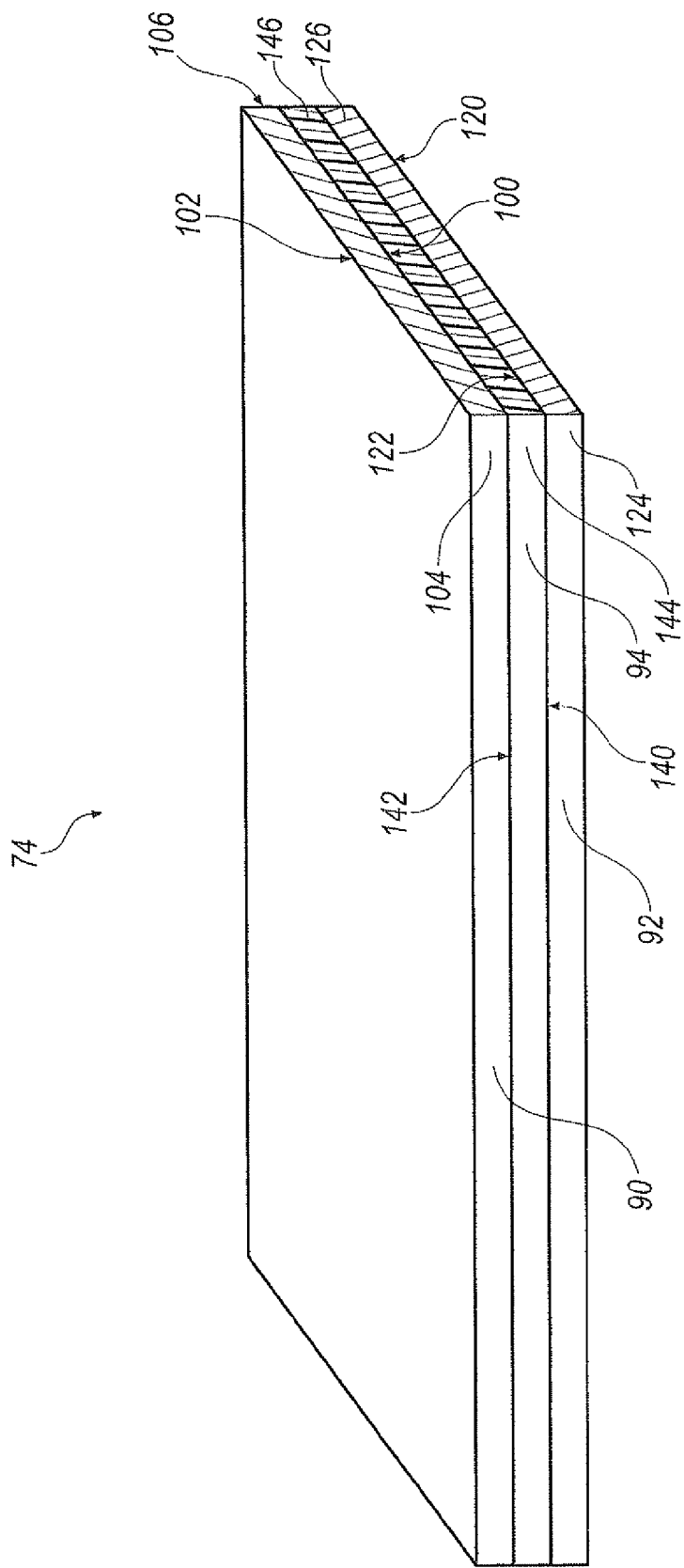
FIG. 5 is a partial sectional, perspective view of area 5 of FIG. 4.

As best seen in FIGS. 3 and 5, the first layer 90 includes a first surface 100, a second surface 102, a first edge 104, a second edge 106, a first end 108, and a second end 110. The second layer 92 includes a first surface 120, a second surface 122, a first edge 124, a second edge 126, a first end 128, and a second end 130. The third layer 94 includes a first surface 140, a second surface 142, a first edge 144, a second edge 146, a first end 148, and a second end 150. The first surface 100 of the first layer 90 is coupled to the second surface 142 of the third layer 94 and the second surface 122 of the second layer 92 is coupled to the first surface 140 of the third layer 94.

As also seen in FIG. 5, the resonator member 74 may be formed by bonding the layers 90, 92 with the layer 94. That is, the layers 90, 92, 94 are laminated such that slip between surfaces 100 and 142 and surfaces 122 and 140 is limited. Briefly, in a damper such as the resonator member 74, the geometry of the resonator member 74 encourages the resonator member 74 to vibrate (resonate) when exposed to vibrational energy at a specific frequency. The geometry of the resonator member 74 can be changed to alter the specific frequency of resonance. As the layers 90, 92, 94 vibrate, the metal layers 90, 92 resonate with the driver frequency (energy). This movement of the metal layers 90, 92 will deform the third layer 94. The third layer 94 will not appreciably resonate with the driver frequency, but will absorb the energy of movement from the layers 90, 92. This absorption of energy may increase the temperature of the third layer 94 as at least a portion of the absorbed energy is converted to heat energy. As the metal layers 90, 92 are further driven by the driver frequency, the third layer 94 absorbs additional energy. Heat, sound, or other forms of converted energy may be dissipated from the driveline 20. Accordingly, each resonator member 74 acts to absorb energy of a specific frequency and convert this energy to a form that can be dissipated without contributing to additional vibrational effects on the driveline 20.

In contrast to the above described conversion of energy by the resonator members 74, a cantilevered mass (such as disclosed in U.S. Pat. No. 2,586,043) will introduce an additional degree of freedom that may produce an additional resonance.

FIGS. 6-10 illustrate alternative embodiments of the damper 70. Each of these embodiments may be interposed within any propshaft of hollow member of a driveline, such as the driveline 20. Further, each of these embodiments operate similar to the operation described above.

Figures 6, 6A:
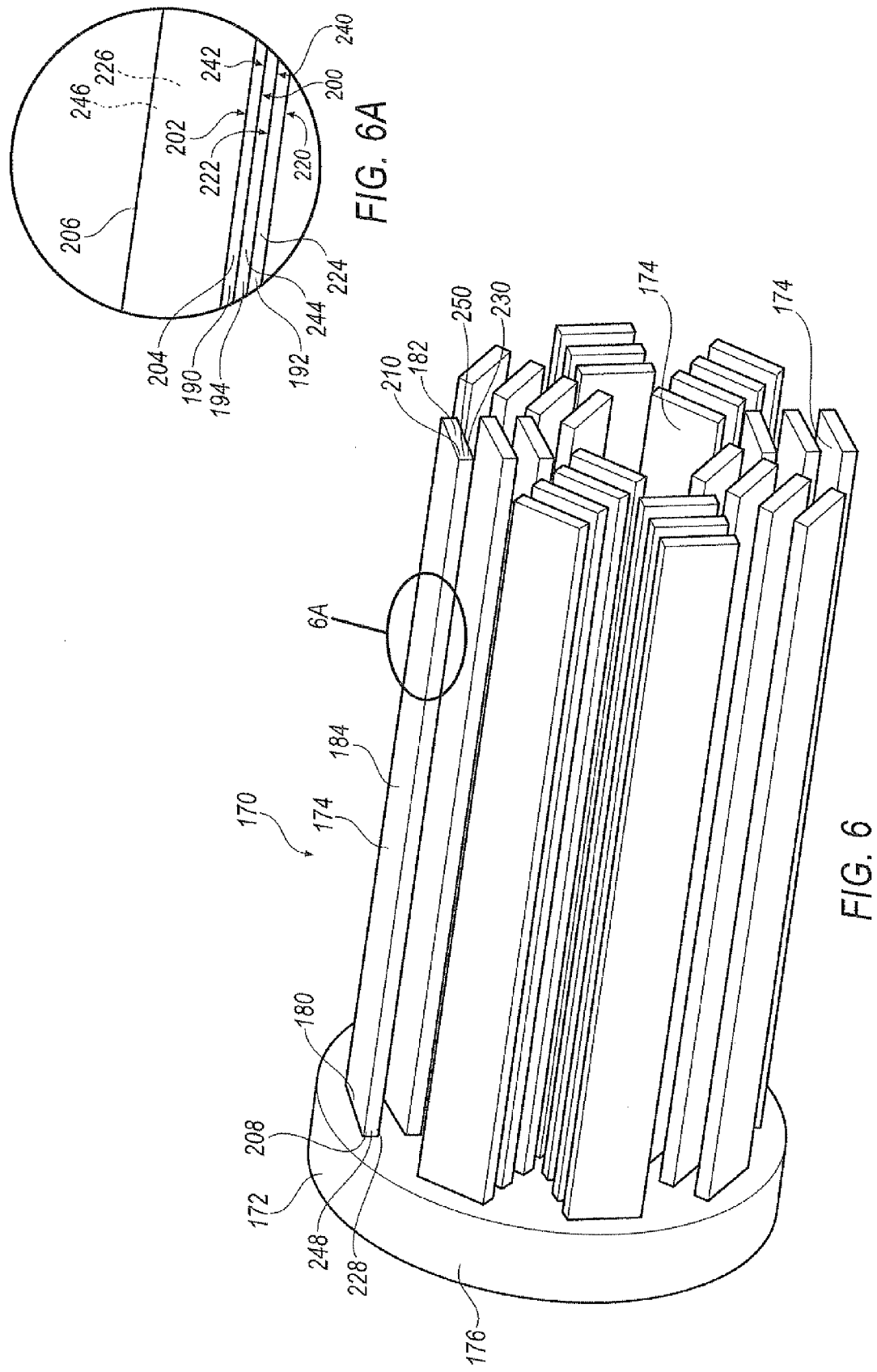
FIG. 6 is a perspective view of an alternative embodiment of the portion of FIG. 4.
FIG. 6A is an enlarged view of area 6A of FIG. 6.

FIG. 6 illustrates another embodiment an array tuned absorber, or damper, 70 as a damper 170. The damper 170 includes a mounting base 172 coupled to the rear prop shaft 54 of the driveline 20 and a plurality of resonator members 174. In the embodiment illustrated, the mounting base 172 has a generally cylindrical outer surface 176 to couple to the inner surface 64 of the rear prop shaft 54, although the mounting base 172 may be coupled to other portions of the driveline 20. Also in the embodiment illustrated, the damper 170 includes twenty-eight (28) resonator members 174.

The resonator members 174 each include a first end 180, a second end 182, and a center portion 184 interposed therebetween. The resonator members are constructed of a first layer 190, a second layer 192, and a third layer 194 interposed between the first layer 190 and the second layer 192. The first end 180 is coupled to the first mounting base 172 and extending therefrom. In the embodiment illustrated, the first ends 180 of the plurality of resonator members 174 are at least partially embedded in the mounting base 172, although any suitable coupling means may be used.

The first layer 190 includes a first surface 200, a second surface 202, a first edge 204, a second edge 206, a first end 208, and a second end 210. The second layer 192 includes a first surface 220, a second surface 222, a first edge 224, a second edge 226, a first end 228, and a second end 230. The third layer 194 includes a first surface 240, a second surface 242, a first edge 244, a second edge 246, a first end 248, and a second end 250. The first surface 200 of the first layer 190 is coupled to the second surface 242 of the third layer 194 and the second surface 222 of the second layer 192 is coupled to the first surface 240 of the third layer 194.

FIGS. 7 and 7A illustrate another embodiment an array tuned absorber, or damper, 70 as a damper 270. The damper 270 includes a mounting base 272 coupled to the rear prop shaft 54 of driveline 20 and a plurality of resonator members 274. In the embodiment illustrated the mounting base 272 has a generally cylindrical outer surface 276 to couple to the inner surface 64 of the rear prop shaft 54, although the mounting base 272 may be coupled to other portions of the driveline 20.

The resonator members 274 each include a first end 280, a second end 282, and a center portion 284 interposed therebetween. The resonator members 274 are constructed of a first layer 290, a second layer 292, and a third layer 294 interposed between the first layer 290 and the second layer 292 (FIG. 7A). The center portion 284 is embedded within the first mounting base 272 and extending therefrom.

The first layer 290 includes a first surface 300, a second surface 302, a first edge 304, a second edge 306, a first end 308, and a second end 310. The second layer 292 includes a first surface 320, a second surface 322, a first edge 324, a second edge 326, a first end 328, and a second end 330. The third layer 294 includes a first surface 340, a second surface 342, a first edge 344, a second edge 346, a first end 348, and a second end 350. The first surface 300 of the first layer 290 is coupled to the second surface 342 of the third layer 294 and the second surface 322 of the second layer 292 is coupled to the first surface 340 of the third layer 294.

FIG. 8 illustrates another embodiment an array tuned absorber, or damper, 70 as a damper 370. The damper 370 includes a mounting base 372 coupled to the rear prop shaft 54 of driveline 20 and a plurality of resonator members 374. The mounting base 372 includes a generally cylindrical outer surface 376 and a generally cylindrical inner surface 378. In the embodiment illustrated the mounting base 372 would be coupled to the inner surface 64 of the rear prop shaft 54, although the mounting base 372 may be coupled to other portions of the driveline 20.

The resonator members 374 each include a first end 380, a second end 382, and a center portion 384 interposed therebetween. The resonator members 374 are constructed of a first layer 390, a second layer 392, and a third layer 394 interposed between the first layer 390 and the second layer 392. The first end 380 is coupled to the first mounting base 372 and extending radially inward therefrom. In the embodiment illustrated, the first ends 380 of the plurality of resonator members 374 are at least partially embedded in the mounting base 372, although any suitable coupling means may be used.

As best seen in FIG. 8A, the first layer 390 includes a first surface 400, a second surface 402, a first edge 404, a second edge 406, a first end 408, and a second end 410. The second layer 392 includes a first surface 420, a second surface 422, a first edge 424, a second edge 426, a first end 428, and a second end 430. The third layer 394 includes a first surface 440, a second surface 442, a first edge 444, a second edge 446, a first end 448, and a second end 450. The first surface 400 of the first layer 390 is coupled to the second surface 442 of the third layer 394 and the second surface 422 of the second layer 392 is coupled to the first surface 440 of the third layer 394.

Figure 9A:
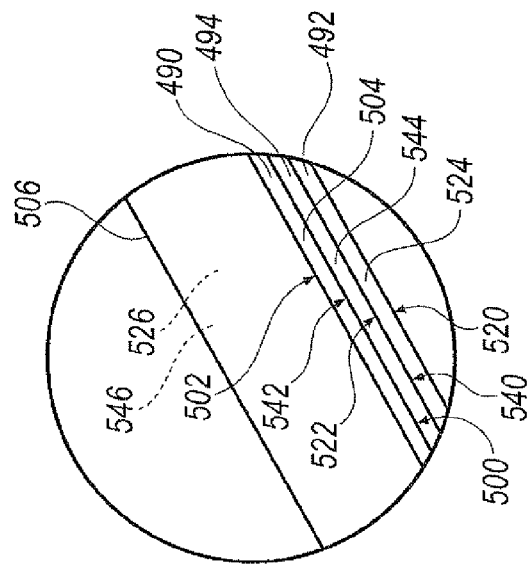
FIG. 9A is an enlarged view of area 9A of FIG. 9.
Figure 9:
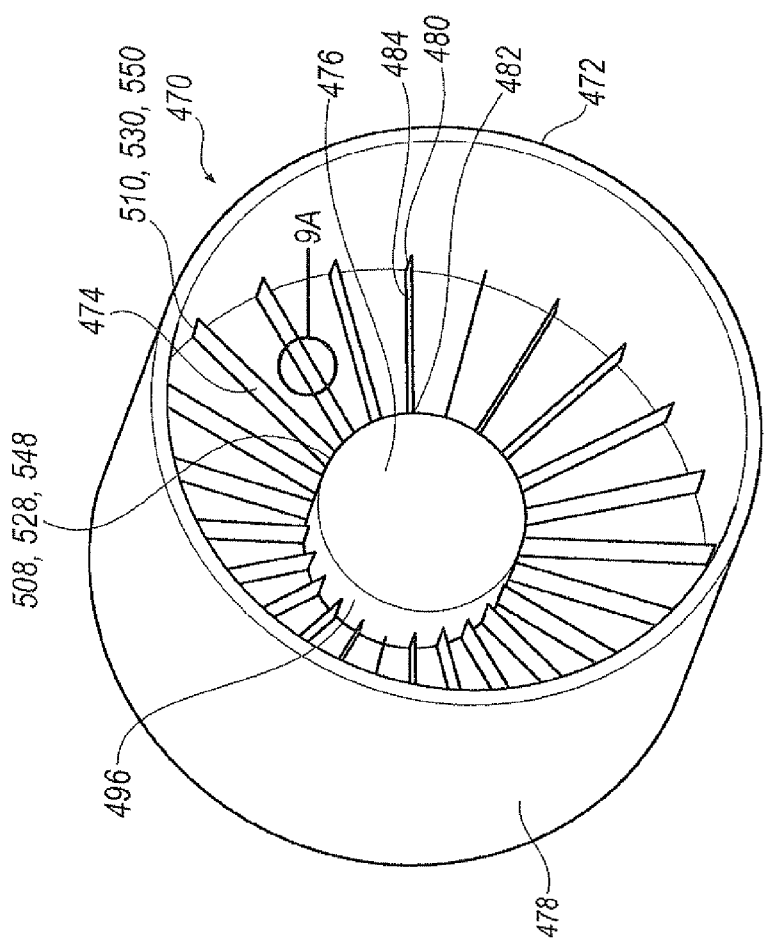
FIG. 9 is a perspective view of an alternative embodiment of the portion of FIG. 4.

FIGS. 9 and 9A illustrate another embodiment an array tuned absorber, or damper, 70 as a damper 470. The damper 470 includes a first mounting base 472 coupled to the rear prop shaft 54 of driveline 20, a plurality of resonator members 474, and a second mounting base 476. The first mounting base 472 includes a generally cylindrical outer surface 478. In the embodiment illustrated the mounting base 472 is coupled to the inner surface 64 of the rear prop shaft 54, although the first mounting base 472 may be coupled to other portions of the driveline 20. Further, the second mounting base 476 may be directly coupled to a portion of the driveline 20.

The resonator members 474 each include a first end 480, a second end 482, and a center portion 484 interposed therebetween. The resonator members 474 are constructed of a first layer 490, a second layer 492, and a third layer 494 interposed between the first layer 490 and the second layer 492. The first end 480 is coupled to the first mounting base 472 and extending radially inward therefrom. The second mounting base 476 includes a generally cylindrical outer surface 496. In the embodiment illustrated, the first ends 480 of the plurality of resonator members 474 are at least partially embedded in the first mounting base 472 and the second ends 482 are at least partially embedded in the second mounting base 476, although any suitable coupling means may be used.

The first layer 490 includes a first surface 500, a second surface 502, a first edge 504, a second edge 506, a first end 508, and a second end 510. The second layer 492 includes a first surface 520, a second surface 522, a first edge 524, a second edge 526, a first end 528, and a second end 530. The third layer 494 includes a first surface 540, a second surface 542, a first edge 544, a second edge 546, a first end 548, and a second end 550. The first surface 500 of the first layer 490 is coupled to the second surface 542 of the third layer 494 and the second surface 522 of the second layer 492 is coupled to the first surface 540 of the third layer 494.

FIG. 10 illustrates another embodiment an array tuned absorber, or damper, 70 as a damper 570. The damper 570 includes a mounting base 572 coupled to the rear prop shaft 54 and a plurality of resonator members 574. The mounting base 572 includes a generally cylindrical outer surface 576 and a generally tubular extension 578. In the embodiment illustrated the extension 578 of the mounting base 572 is coupled to the first end 66 of the rear prop shaft 54, although the mounting base 572 may be coupled to other portions of the driveline 20.

The resonator members 574 each include a first end 580, a second end 582, and a center portion 584 interposed therebetween. The second end 582 of the resonator member 574 does not contact the inside surface 64 of the rear prop shaft 54. The resonator members 574 are constructed of a first layer 590, a second layer 592, and a third layer 594 interposed between the first layer 590 and the second layer 592 (FIG. 10A). The first end 580 is coupled to the first mounting base 572 and extending radially inward therefrom. In the embodiment illustrated, the first ends 580 of the plurality of resonator members 574 are at least partially embedded in the mounting base 572, although any suitable coupling means may be used.

As best seen in FIG. 10A, the first layer 590 includes a first surface 600, a second surface 602, a first edge 604, a second edge 606, a first end 608, and a second end 610. The second layer 592 includes a first surface 620, a second surface 622, a first edge 624, a second edge 626, a first end 628, and a second end 630. The third layer 594 includes a first surface 640, a second surface 642, a first edge 644, a second edge 646, a first end 648, and a second end 650. The first surface 600 of the first layer 590 is coupled to the second surface 642 of the third layer 594 and the second surface 622 of the second layer 592 is coupled to the first surface 640 of the third layer 594.

Figure 11:
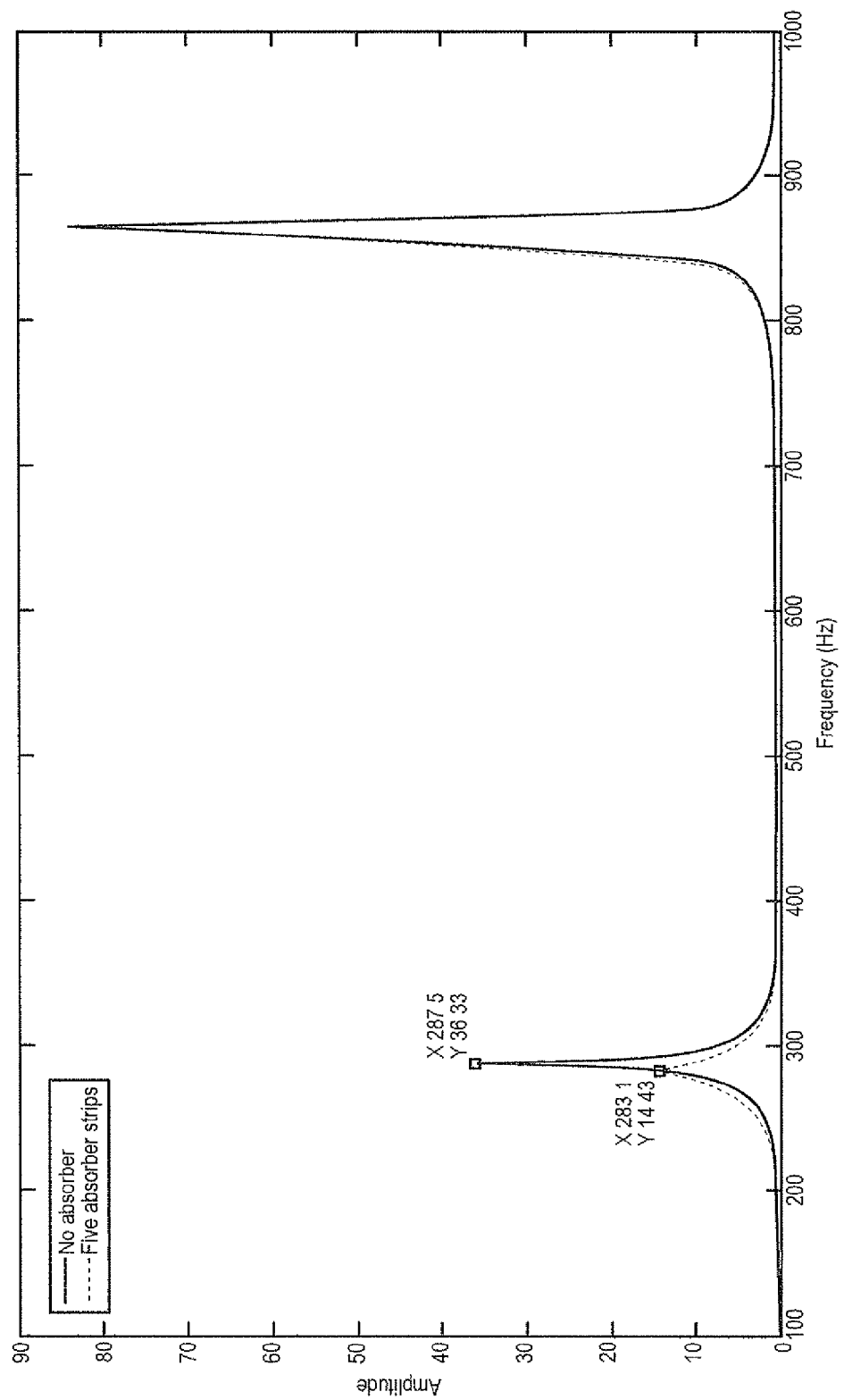
FIG. 11 is a graphical representation of measurements taken from a vibration test of an exemplary device.

FIG. 11 illustrates a graphical representation of an array tuned absorber with resonator members tuned for about 287.5 hertz (Hz). For a portion of a driveline, such as the driveline 20, without an array tuned absorber, the amplitude (represented in terms of acceleration divided by force) of vibrations at about 287.5 Hz is about 36. With an array tuned absorber having resonator members tuned for about 287.5 Hz, the amplitude is about 14.43. Accordingly, the magnitude of the amplitude has been reduced with the use of the array tuned absorber. Further, the resonance (driven frequency) of the portion of the driveline has slightly shifted (from 287.5 Hz to 283.7 Hz) as a result of the presence of the absorber. The graphical representation of FIG. 11 represents testing performed with five (5) resonator members 174 directly connected to a propshaft without a mounting base.

In the embodiments illustrated, the resonator members 74, 174, 274, 374, 474, 574 are constrained layer dampers, although other suitable members may be used. The first layers and the second layers are metal and the third layer is a resin, such as mastic. That is, the third layer is sufficiently flexible to permit relative movement between the first layer and the second layer while converting the energy of movement to heat, sound, or other forms of energy that results in the dissipation of energy of movement.

Figure 12:
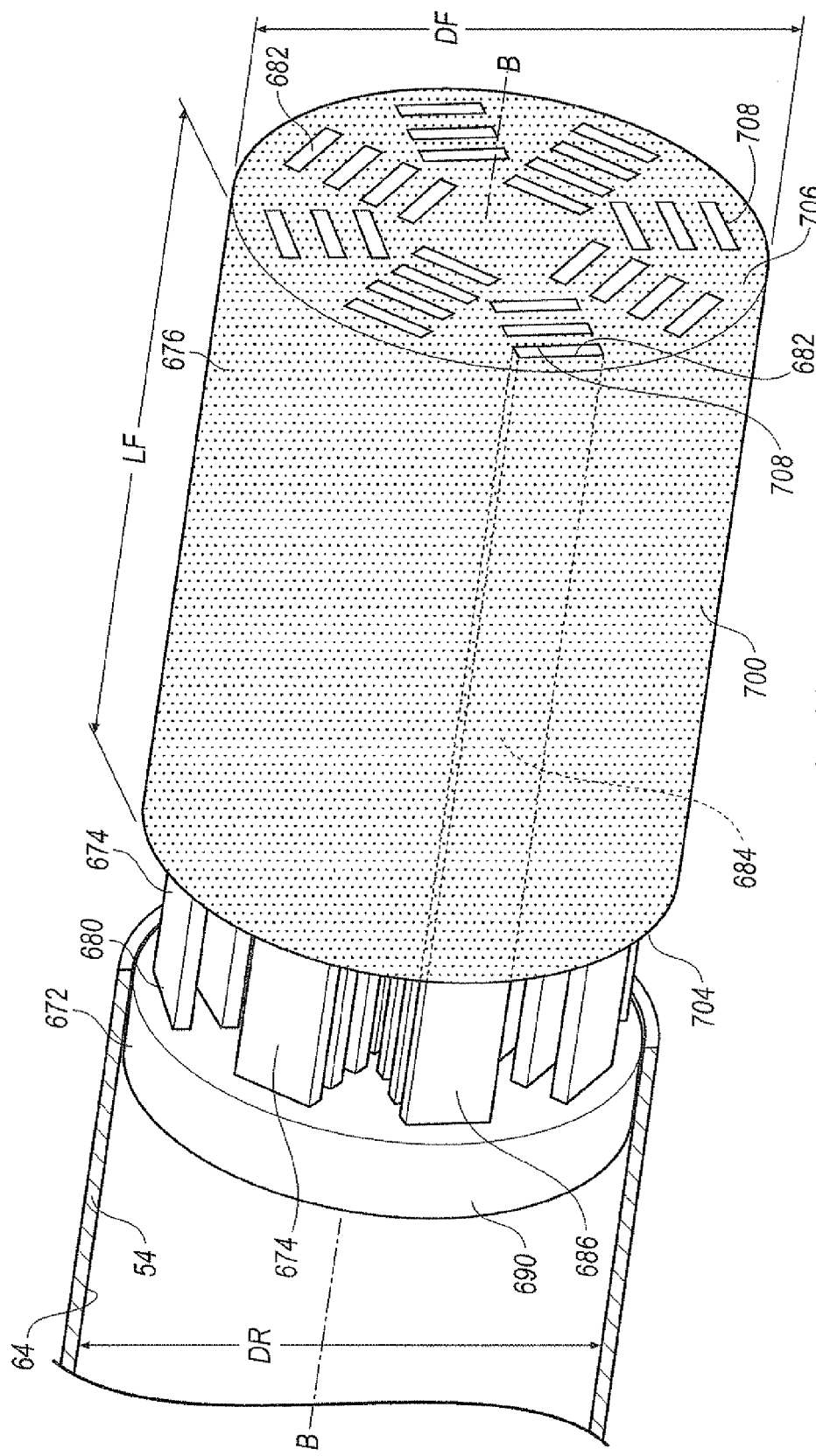
FIG. 12 is a perspective view of an alternative embodiment of the portion of FIG. 4.

FIG. 12 illustrates another embodiment an array tuned absorber, or damper, 70 as a damper 670. The damper 670 includes a mounting base 672 coupled to the rear prop shaft 54 of driveline 20, a plurality of resonator members 674, and a damping portion 676. The rear prop shaft 54 of driveline 20 has in inner diameter of dimension DR. The damping portion, prior to installation within the rear prop shaft 54, has a length LF and an outside diameter of dimension DF, which is greater than dimension DR.

The resonator members 674 each include a first end 680, a second end 682, a center portion 684 interposed therebetween, and an outer surface 686. The resonator members 674 are constructed of a single material, although layers of differing materials may be used. The first ends 680 are embedded within the first mounting base 672 and extending therefrom. In the embodiment illustrated, the second ends 682 and the center portions 684 are embedded within the damping portion 676.

In the embodiment illustrated, the mounting base 672 has a generally cylindrical outer surface 690 to couple to the inner surface 64 of the rear prop shaft 54, although the mounting base 672 may be coupled to other portions of the driveline 20. The damping portion 676 includes an outer surface 700, a first end surface 704, a second end surface 706, and a plurality of apertures 708. The apertures 708 may be slits formed in the damping portion 676 with no material removed, or may be formed by the removal of material.

In the embodiments illustrated, the damping portion 676 is CF-40 CONFORR foam from E-A-R Specialty Composites, 7911 Zionsville Road, Indianapolis, Ind., although other materials, such as heavily damped foams, may be used. Additionally, the diameter of the damping portion 676 prior to installation within the rear prop shaft 54 may be much larger than the diameter of the rear prop shaft 54, such as, for example, dimension DF may be more than 4 times larger than dimension DR. Also in the embodiments illustrated, the resonator members 674 are constructed of spring steel, although other suitable materials may be used.

In one embodiment of installing the damper 670 within the rear prop shaft 54, the damper 670 is constructed generally as shown in FIG. 12. The damper 670 is then inserted into the rear propshaft 54 as the damping portion 676 is compressed toward the axis B-B. The damping portion 676 may be affixed to the inner surface 64 of the rear propshaft 54, such as with an adhesive, or may be interposed therein to contact the inside surface 64 in an interference fit to stiffen the damping portion 676.

In the embodiments illustrated, first layers and the second layers are metal and/or metal alloy, although other suitable materials may be used. While the resonator members are illustrated and described herein as affixed to at least one mounting base, the resonator members may be coupled to the mounting bases by any adequate means that enables the resonator members to dissipate energy. Additionally, the mounting bases, while illustrated in various shapes such as cylindrical, curved and disk-shaped, may be any suitable shape for attachment to the driveline 20, or the resonator members may be directly attached to a driveline member without a mounting base. Further the mounting bases may be constructed of any suitable material to transmit vibrational energy, such as steel, and the mounting bases may be attached to a driveline component, or be a portion thereof. Attachment of a mounting base to a driveline component, if desired, may be accomplished by adhesive, welding, or other suitable methods.

As illustrated herein, the dampers may be coupled to any driveline member, such as a propshaft tubular wall or end piece. While attenuating includes lessening the amount, force, magnitude, or value, the resonator, in one non-limiting embodiment may reduce the magnitude of vibrational energy, and/or may transform a resonate vibration to a different frequency to avoid the operation of a driveline member at an undesired frequency.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A vehicle driveline comprising:
   a tubular member having an inside surface and an axis;
   a first mounting base coupled to the tubular member;
   a plurality of resonator members each having a first end, a second end, and a center portion interposed therebetween, wherein at least a portion of the resonator members are coupled to the first mounting base and extending therefrom, wherein each of the plurality and resonating members are constrained layer damping members having two layers of metal with a resin layer interposed therebetween; and
   a second mounting base affixed to the tubular member, wherein the second ends of the plurality of resonator members are embedded in the second mounting base.

2. The driveline of claim 1, wherein the plurality of resonating members includes at least twelve (12) resonating members, which resonating members are defined by outer dimensions that are generally the same.

3. The driveline of claim 1, wherein each of the first ends of the plurality of resonator members are embedded in the first mounting base.

4. The driveline of claim 1, wherein the second mounting base is positioned so as to be co-axially aligned with the first mounting base, and each of the plurality of resonator members extends longitudinally through the tubular member at a generally radial distance relative to the axis of the tubular member.

5. The driveline of claim 4, wherein the second mounting base contacts only the plurality of resonator members and the inside surface of the tubular member.

6. The driveline of claim 1, wherein each of the plurality of resonating members are tuned to resonate at about the same frequency.

7. The driveline of claim 1, wherein each of the plurality of resonating members extend from the first mounting base generally parallel to the axis of the tabular member.

8. A vehicle driveline comprising
   a tubular member having an inside surface and an axis;
   a first mounting base coupled to the tubular member;

a plurality of resonator members each having a first end, a second end, and a center portion interposed therebetween;

a second mounting base affixed to the tubular member; and a damping portion;

wherein at least a portion of the resonator members are coupled to the first mounting base and extending therefrom;

wherein the second ends of the plurality of resonator members are embedded in the second mounting base; and wherein at least a portion of the plurality of resonator members are embedded in the damping portion.

9. The driveline of claim 8, wherein the damping portion is in contact with the inside surface of the tubular member.

* * * * *

UNITED STATES PATENT AND TRADEMARK OFFICE
CERTIFICATE OF CORRECTION

PATENT NO. : 8,454,449 B2
APPLICATION NO. : 12/742140
DATED : June 4, 2013
INVENTOR(S) : Arthur Ball et al.

Page 1 of 1

It is certified that error appears in the above-identified patent and that said Letters Patent is hereby corrected as shown below:

In the Claims

Column 8, line 36 change "of the plurality and resonating" to --of the plurality of resonating--.

Column 8, line 64 change "tabular" to --tubular--.

Signed and Sealed this
Sixteenth Day of July, 2013

Teresa Stanek Rea
*Acting Director of the United States Patent and Trademark Office*